(12) United States Patent
Cheng

(10) Patent No.: US 8,938,157 B2
(45) Date of Patent: Jan. 20, 2015

(54) DIGITAL CHIP AND METHOD OF OPERATION THEREOF

(75) Inventor: Lee Ming Cheng, Hong Kong (CN)

(73) Assignee: City University of Hong Kong, Kowloon (HK)

( * ) Notice: Subject to any disclaimer, the term of this patent is extended or adjusted under 35 U.S.C. 154(b) by 556 days.

(21) Appl. No.: 12/710,525

(22) Filed: Feb. 23, 2010

(65) Prior Publication Data

US 2011/0206350 A1   Aug. 25, 2011

(51) Int. Cl.
*H04N 5/92* (2006.01)
*G06T 1/00* (2006.01)

(52) U.S. Cl.
CPC ........... *G06T 1/0021* (2013.01); *G06T 2200/28* (2013.01)
USPC ....................................... 386/260

(58) Field of Classification Search
CPC .................... H04N 5/913; H04N 2005/91335; G11B 20/00086; G11B 20/00768; G11B 20/00884; G06T 2200/28; G06T 1/0021
USPC ....................................... 386/260
See application file for complete search history.

(56) References Cited

U.S. PATENT DOCUMENTS

| | | | |
|---|---|---|---|
| 5,825,892 A | 10/1998 | Braudaway et al. | |
| 5,875,249 A | 2/1999 | Mintzer et al. | |
| 5,905,800 A | 5/1999 | Moskowitz et al. | |
| 5,915,027 A | 6/1999 | Cox et al. | |
| 6,408,082 B1 | 6/2002 | Rhoads et al. | |
| 6,614,914 B1 | 9/2003 | Rhoads et al. | |
| 6,671,387 B1 * | 12/2003 | Chen et al. | 382/100 |
| 7,020,304 B2 | 3/2006 | Alattar et al. | |
| 7,047,413 B2 | 5/2006 | Yacobi et al. | |
| 7,392,392 B2 | 6/2008 | Levy | |
| 7,435,016 B2 | 10/2008 | Nomura | |
| 2008/0055471 A1 * | 3/2008 | Tsui | 348/565 |
| 2008/0130883 A1 * | 6/2008 | Agaian et al. | 380/54 |
| 2008/0273741 A1 * | 11/2008 | Fujii et al. | 382/100 |
| 2008/0285790 A1 * | 11/2008 | Au et al. | 382/100 |
| 2009/0087021 A1 * | 4/2009 | Thorwirth | 382/100 |
| 2009/0141927 A1 * | 6/2009 | Wang et al. | 382/100 |

OTHER PUBLICATIONS

U.S. Appl. No. 11/124,016, filed Aug. 2005, Gerald R. Black.
U.S. Appl. No. 11/460,207, filed Jul. 2006, Daoshen Bi.
(Continued)

*Primary Examiner* — Thai Tran
*Assistant Examiner* — William Tran
(74) *Attorney, Agent, or Firm* — Amin, Turocy & Watson, LLP

(57) ABSTRACT

A digital chip system, digital chip, methods for embedding data and methods for extracting data are provided. In some embodiments, a digital chip includes: a watermark encoder digital chip configured to receive one or more watermark bits and generate a stego-video; and a watermark decoder digital chip configured to receive the stego-video and extract the one or more watermark bits from the stego-video. In some embodiments, the digital chip also includes: a video decoder controller digital chip configured to receive raw video data, wherein the raw video data is received from a video decoder; a configuration controller digital chip configured to configure the video decoder; a memory management unit digital chip configured to store at least one of the raw video frame, the raw video data or the stego-video; and an Ethernet controller unit digital chip configured to store or access the raw video or stego-video.

12 Claims, 13 Drawing Sheets

(56) References Cited

OTHER PUBLICATIONS

U.S. Appl. No. 11/527,361, filed Sep. 2006, Trent J. Brundage.

U.S. Appl. No. 11/115,900, filed Apr. 2007, Walter Haenel.
U.S. Appl. No. 11/520,532, filed Sep. 2006, Robert P. Vallone.

* cited by examiner

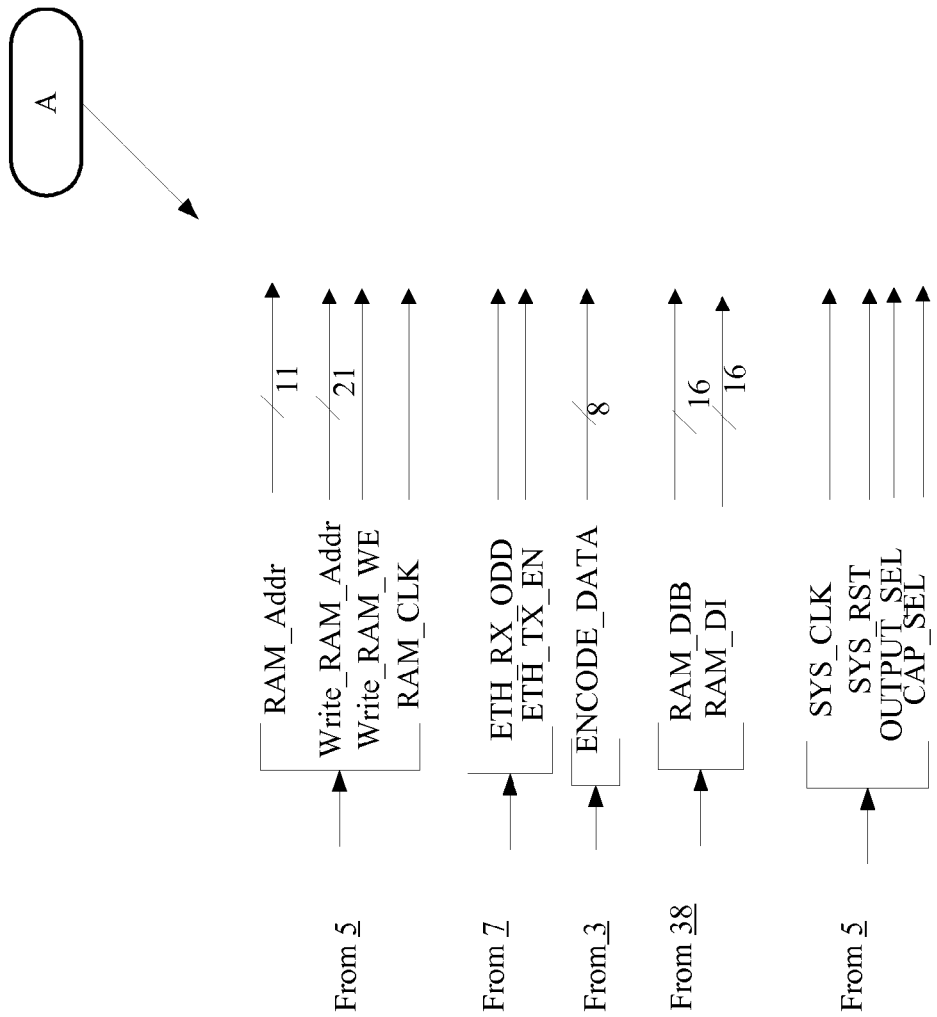

DIGITAL CHIP AND METHOD OF OPERATION THEREOF

BACKGROUND

I. Field

The following description relates to digital chips, in general, and to digital forensic chips, in particular.

II. Background

Conventional digital forensic techniques are employed to identify the originality and/or integrity of document, video and/or image information. The utility of these techniques varies significantly based on the accuracy of the models of the capture devices. For example, models may or may not accurately account for noise in the sensor of the capture device. In addition to the shortcomings related to the models of the capture devices, conventional digital forensic techniques disadvantageously perform computations offline in a computation engine separate from the capture device. Further, many conventional techniques employ personal or embedded computer systems for which latency between the activating device and the computer system is significant.

Accordingly, there is a desire for digital forensic chips and real-time techniques that provide flexibility via online and offline modes for generating and detecting forensic data, monitoring the originality and/or integrity of the data, and/or authenticating and providing information security.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In one or more of the embodiments, a digital chip that can generate and/or detect one or more embedded, invisible digital forensic data sequences is described herein. The digital forensic data sequences can be used to prove the integrity of video or image data. In various embodiments, the chip is not limited to offline and static image applications. Rather, the chip can perform the functions described herein while in an online mode and/or on video and other dynamic applications. One or more of the embodiments can be utilized for e-commerce authentication, the digital video recording industry and devices and/or forensic applications. Currently, no digital chips are available for performing the aforementioned functions.

In one embodiment, a digital chip is provided. The digital chip can include: a watermark encoder digital chip configured to receive one or more watermark bits and generate a stego-video; and a watermark decoder digital chip configured to receive the stego-video and extract the one or more watermark bits from the stego-video.

In another embodiment, a digital chip system is provided. The digital chip system can include: a digital chip. The digital chip can include: a watermark encoder digital chip configured to receive one or more watermark bits and generate a stego-video; and a watermark decoder digital chip configured to receive the stego-video and extract the one or more watermark bits from the stego-video.

In another embodiment, a data extraction method is provided. The data extraction method can include: calculating a gray value difference of a gray value of an upper pixel and a gray value of a left pixel relative to a gray value of an input pixel received in a frame of stego-video; determining a number of bits that can be extracted from the input pixel. The method can also include: extracting an embedded value of a plurality of embedded values; and obtaining a number of bits of secret data by converting the embedded value into a binary string.

In another embodiment, a data embedding method is provided. The data embedding method can include: calculating a gray value difference of a gray value of an upper pixel and a gray value of a left pixel relative to an input pixel received in a raw video frame; and determining a number of bits that can be embedded in the input pixel. The method can also include: converting the number of bits to an integer value; and calculating a new gray value of the input pixel with which to encode the input pixel. The new gray value can be a function of at least one or more of the integer value, the number of bits, the gray value of the upper pixel or the gray value of the left pixel.

In another embodiment, a data embedding method is provided. The data embedding method can include: estimating a capacity of an input pixel of a video frame based on information associated with a plurality of pixels neighboring the input pixel. The plurality of pixels can be an upper pixel and a left pixel, relative to the input pixel. The method can also include embedding at least one watermark bit in the input pixel of the video frame by raster-scan order.

Toward the accomplishment of the foregoing and related ends, the one or more embodiments comprise the features hereinafter fully described and particularly pointed out in the claims. The following description and the annexed drawings set forth herein detail certain illustrative embodiments of the one or more embodiments. These embodiments can be indicative, however, of but a few of the various ways in which the principles of various embodiments can be employed and the described embodiments can be intended to include all such embodiments and their equivalents.

BRIEF DESCRIPTION OF THE DRAWINGS

FIGS. 5A and 5B illustrate partial views of a circuit diagram including a memory management unit in accordance with an embodiment of the present invention;

DETAILED DESCRIPTION

Figure 1:
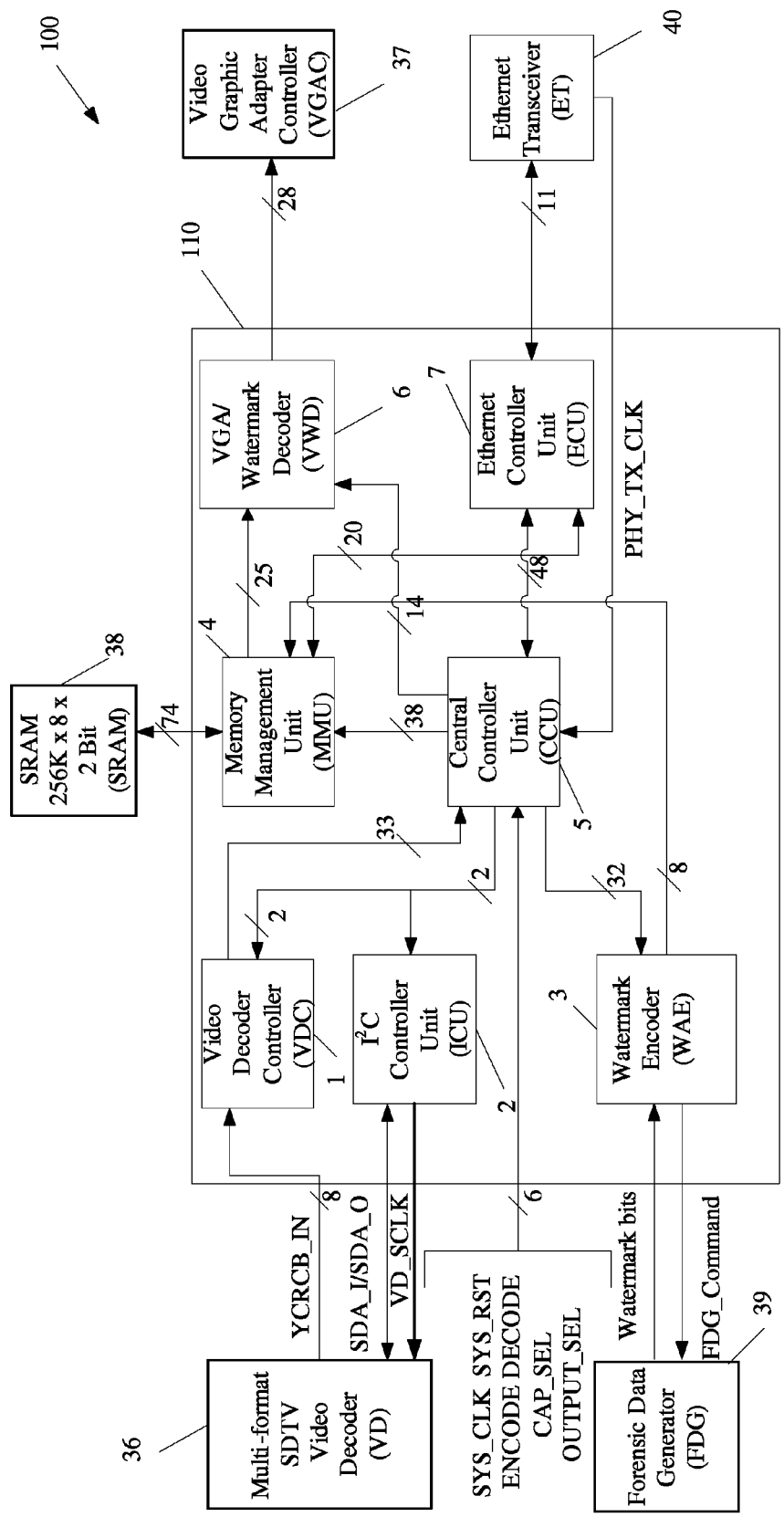
FIG. 1 is a circuit diagram including a digital forensic chip in accordance with an embodiment of the present invention.

Various embodiments are now described with reference to the drawings, wherein like reference numerals are used to refer to like elements throughout. In the following description, for purposes of explanation, numerous specific details are set forth in order to provide a thorough understanding of one or more embodiments. In other instances, well-known structures and devices is shown in block diagram form in order to facilitate describing one or more embodiments. By way of example, but not limitation, bit numbers, model numbers, resolution, signal identifiers and names, and/or component model numbers may be transmitted in describing or illustrating various embodiments. It may be evident, however, that such embodiments may be practiced without these specific details. Further, all such alternative embodiments that achieve the functionality of that described herein are envisaged and within the scope of the embodiments disclosed.

FIG. 1 is a circuit diagram including a digital forensic chip system in accordance with an embodiment of the present invention. The digital forensic chip system 100 can include a Digital Forensic Chip (DFC) 110, a Multi-format Standard Definition Television (SDTV) Video Decoder (collectively, VD) 36, a Forensic Data Generator (FDG) 39, a Video Graphic Adapter Controller (VGAC) 37, a Static Random Access Memory (SRAM) 38, and/or an Ethernet Transceiver (ET) 40.

In various embodiments, one or more of the DFC 110, VD 36, FDG 39, VGAC 37, SRAM 38, and/or ET 40 can be digital chips configured to perform the functions described herein.

The VD 36, DFC 110, FDG 39, VGAC 37, SRAM 38 and/or the ET 40 can be coupled to one another for performing the functions of the system 110 described herein.

The DFC 110 can include a Video Decoder Controller (VDC) 1, an I²C Controller Unit (ICU 2), a Watermark Encoder (WAE) 3, a Memory Management Unit (MMU) 4, a Central Controller Unit (CCU) 5, a combination Video Graphics Array (VGA) and Watermark Decoder (collectively, VWD) 6, and an Ethernet Controller Unit (ECU) 7.

In some embodiments, the computational units can be VDC 1, ICU 2, WAE 3, MMU 4, VWD 6, and/or the ECU 7. In various embodiments, one or more of the VDC 1, ICU 2, WAE 3, MMU 4, CCU 5, VWD, and/or ECU 7 can be digital chips configured to perform the functions described herein.

In the embodiment shown, the VD 36 can have an output port communicatively coupled to an input port of the VDC 1 and to an input port of the ICU 2. The VDC 1 can also have an output port communicatively coupled to an input port of the CCU 5 and an input port communicatively coupled to an output port of the CCU 5.

In some embodiments, a YCRCB_IN video signal can be transmitted to the VDC 1 from the VD 36. The YCRCB_IN video signal can be an 8-bit signal in some embodiments. A control signal configured to control the VDC 1 can be transmitted from the CCU 5. The control signal can be a 2-bit signal in some embodiments. Video data can be transmitted between the VDC 1 and the CCU 5. The video data can be a 33-bit signal in some embodiments.

The ICU 2 can have an output port communicatively coupled to an input port of the VD 36, and an input port communicatively coupled to an output port of the VD 36. The ICU 2 can also have an input port communicatively coupled to an output port of the CCU 5.

In some embodiments, the ICU 2 can transmit an SDA_I/SDA_O signal to, and receive a VD_SCLK of VD signal from, the VD 36. The SDA_I/SDA_O signal can be a data signal and the VD_SCLK signal can be a clock signal. The ICU 2 can also receive a control signal from the CCU 5 for controlling the ICU 2. The control signal can be a 2-bit signal in some embodiments. As used herein, the term "configuration controller" can also represent the ICU 2 and/or one or more of the structure and/or functions of the ICU 2.

The WAE 3 can have an output port communicatively coupled to an input port of the FDG 39 while the FDG 39 can have an output port communicatively coupled to an input port of the WAE 3. The WAE 3 can also have an input port communicatively coupled to an output port of the CCU 5, and an output port communicatively coupled to an input port of the MMU 4.

The WAE 3 can transmit a FDG_Command signal to the FDG 39, and receive watermark bits from the FDG 39. In some embodiments, the FDG_Command can be a signal requesting that the FDG 39 transmit one or more watermark bits to the WAE 3. The WAE 3 can receive video data and control signals for controlling the WAE 3 from the CCU 5. The video data and/or control signals can be 32-bit signals in some embodiments. The WAE 3 can output encoded data to the MMU 4. The encoded data can be a stego-video having secret data and/or one or more watermark bits embedded to form the stego-video in some embodiments.

In addition to the input port communicatively coupled to the WAE 3, and over which encoded data can be received, the MMU 4 can have a first port between which communication with the SRAM 38 is provided, and a second port between which communication with the ECU 7 is provided. The MMU 4 can also have an output port communicatively coupled to an input port of the VWD 6.

The input and output signals between the MMU 4 and the SRAM 38 can be 74-bit signals in some embodiments. An input signal of random access memory (RAM) data and control data can be transmitted from the CCU 5 to the MMU 4. In some embodiments, the RAM data and/or control data can be 38-bit signals. The MMU can transmit an output signal to the VWD 6 and receive an input signal from the CCU 5. The output signal to the VWD 6 can be a 25-bit signal. In some embodiments, the output signal can be raw video, one or more raw video frames, stego-video, one or more watermark bits, a watermark bitmap image or any other information stored in the MMU 4.

The VWD 6 can have a first input port communicatively coupled to the MMU 4 and a second input port communicatively coupled to the CCU 5. The VWD can receive the aforementioned signals over the input ports.

The VWD 6 can have an output port communicatively coupled to the VGAC 37. Input and control signals for providing an Red-Green-Blue (RGB) video format to the VGAC 37 can be transmitted from the VWD 6. The signal can be 28-bit signal in some embodiments.

The ECU 7 can have a first port over which communication with the CCU 5 can be provided, a second port over which communication with the MMU 4 can be provided, and a third port over which communication with the ET 40 can be provided.

Input and output signals of the ECU 7 can be transmitted to and from the ET 40. In some embodiments, the signals can be video data, stego-video, Ethernet protocol and/or control information. In some embodiments, the video data or stego-data can be received by the ET 40 and transmitted to the ECU 7 from a location remote from the DFC 110. The signals can be 11-bit signals in some embodiments.

Input and output signals of video data and control signals can be transmitted between the ECU 7 and the MMU 4 and CCU 5. In some embodiments, the input and output signals between the ECU 7 and the MMU 4 can be 20-bit signals, and the input and output signals between the ECU 7 and the CCU 5 can be 48-bit signals. In some embodiments, the signals transmitted between the ECU 7 and the MMU 4 can be control signals and/or information stored in memory at the MMU 4. In some embodiments, the signals transmitted between the ECU 7 and the CCU 5 can be control information and/or video, stego-video and/or other information received from a location remote from the DFC 110. In some embodiments, a PHY_TX_CLK input signal can be transmitted from the ET 40 to the CCU 5. The PHY_TX_CLK signal can be a clock signal.

In addition to the ports described above, the CCU 5 can also have an input port communicatively coupled to an input port of the DFC 110. SYS_CLK, SYS_RST, ENCODE, DECODE, CAP_SEL and OUT_SEL input signals can be transmitted to the CCU 5 from one or more external switches communicatively coupled to the input port of the DFC 110. The SYS_CLK, SYS_RST, ENCODE, DECODE, CAP_SEL and OUT_SEL input signals can be a clock, reset, encode, decode, capacitor design signal and/or output impedance selection signals, respectively.

Figure 2:
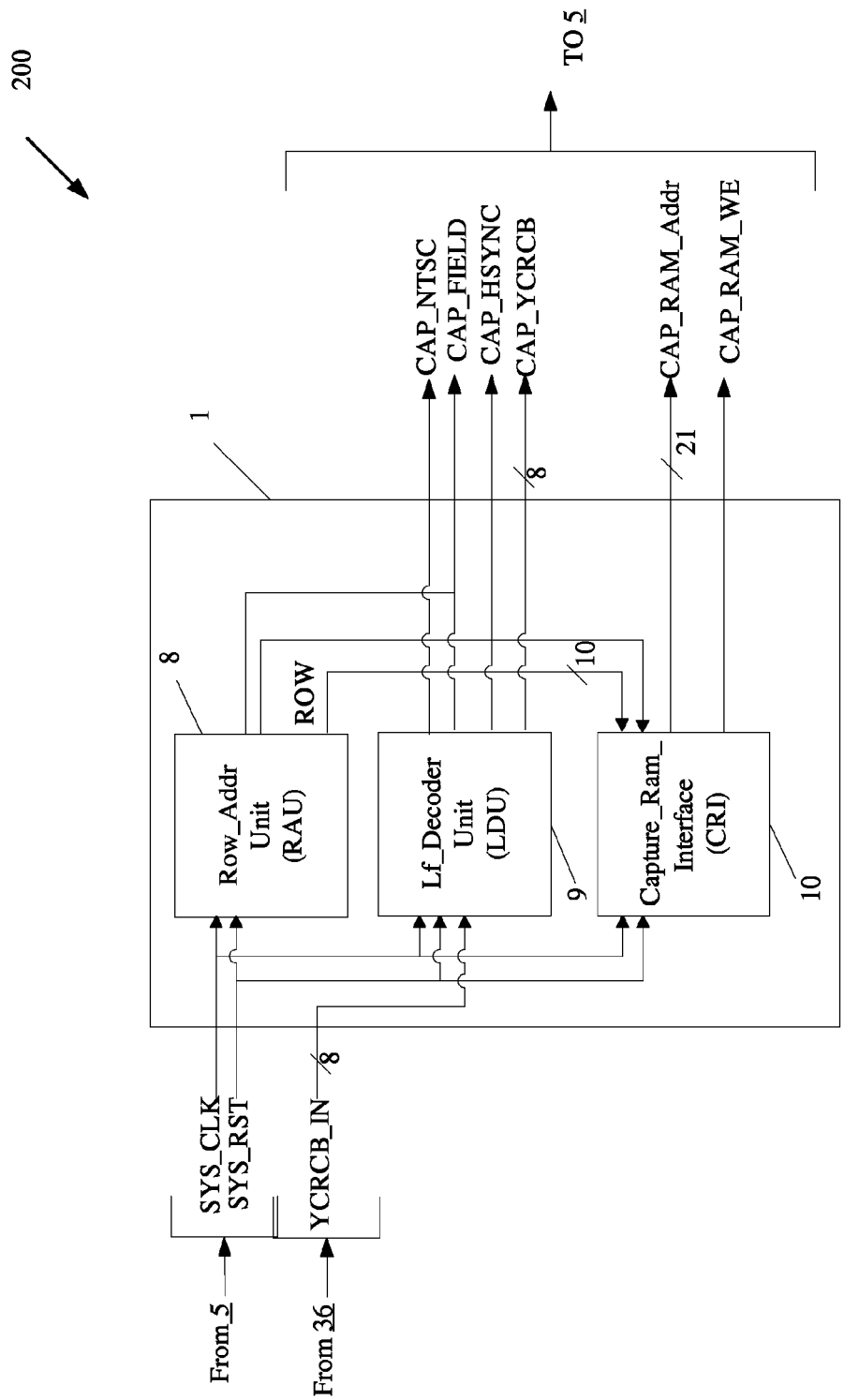
FIG. 2 is a circuit diagram including a video decoder controller in accordance with an embodiment of the present invention.

FIG. 2 is a circuit diagram including a VDC in accordance with an embodiment of the present invention. The VDC 1 can be configured to interface with the VD 36 for receiving and/or processing raw video data.

The VDC 1 can include a Row_Addr Unit 8, an LF_Decoder Unit 9 and a Capture_RAM_Interface (CRI) 10. In various embodiments, one or more of the Row_Addr Unit 8 (RAU), LF_Decoder Unit (LDU) 9 and/or Capture_RAM Interface (CRI) 10 can be digital chips configured to perform the functions described herein. The Row_Addr Unit, LF_Decoder Unit 9 and/or the CRI 10 can be communicatively coupled to one another for performing the functions of the VDC 1 described herein.

With reference to FIGS. 1, and 2, the RAU 8 can have one or more input ports communicatively coupled to an output port of the CCU 5 and one or more output ports communicatively coupled to an input port of the CRI 10. The RAU 8 can be configured to generate row address signals for a video frame input to the VDC 1. As described above, the video frame can be input from the VD 36 (not shown). The RAU 8 can also receive a System Clock signal (SYS_CLK) and/or a System Reset signal (SYS_RST). In some embodiments, the SYS_CLK signal can have a value of 27 megahertz (MHz).

The LDU 9 can have one or more input ports communicatively coupled to an output port of the CCU 5 and an output port of the VD 36, and one or more output ports communicatively coupled to an input port of the CCU 5. The LDU 9 can be configured to generate video timing information signals. In some embodiments, the video timing information signals can be a System Clock signal (SYS_CLK), a System Reset signal (SYS_RST) of active high and/or a video signal (YCRCB_IN) in the form of YCrCb format. In some embodiments, the SYS_CLK signal can have a value of 27 megahertz (MHz). In some embodiments, the YCRCB_IN signal can be an 8-bit signal.

The LDU 9 can output video timing information signals to the CCU 5. The video timing signals output can be a video format signal (CAP_NTSC), a field synchronization signal (CAP_FIELD) and/or a horizontal synchronization signal (CAP_HSYNC). In some embodiments, a time delayed captured YCrCb formatted video signal (CAP_YCRCB) can also be output.

The CRI 10 can have one or more input ports communicatively coupled to an output port of the CCU 5 and one or more output ports communicatively coupled to an input port of the CCU 5. The CRI 10 can also receive the SYS_CLK and the SYS_RST signals. The CRI 10 can be configured to capture a video frame and generate the corresponding memory address signals for writing the video data to an SRAM 38 when the write enable signal is active. The captured video can be video provided to the CRI 10 by the VD 36. In some embodiments, a captured video random access memory (RAM) address signal (CAP_RAM_Addr) can be output from the CRI 10 and/or a capture video RAM write enable signal (CAP_RAM_WE) can be output from the CRI 10. The CAP_RAM_Addr and/or the CAP_RAM_WE can be output to the CCU 5, and the CAP_RAM_Addr signal can be a 21-bit signal in some embodiments.

Figure 3:
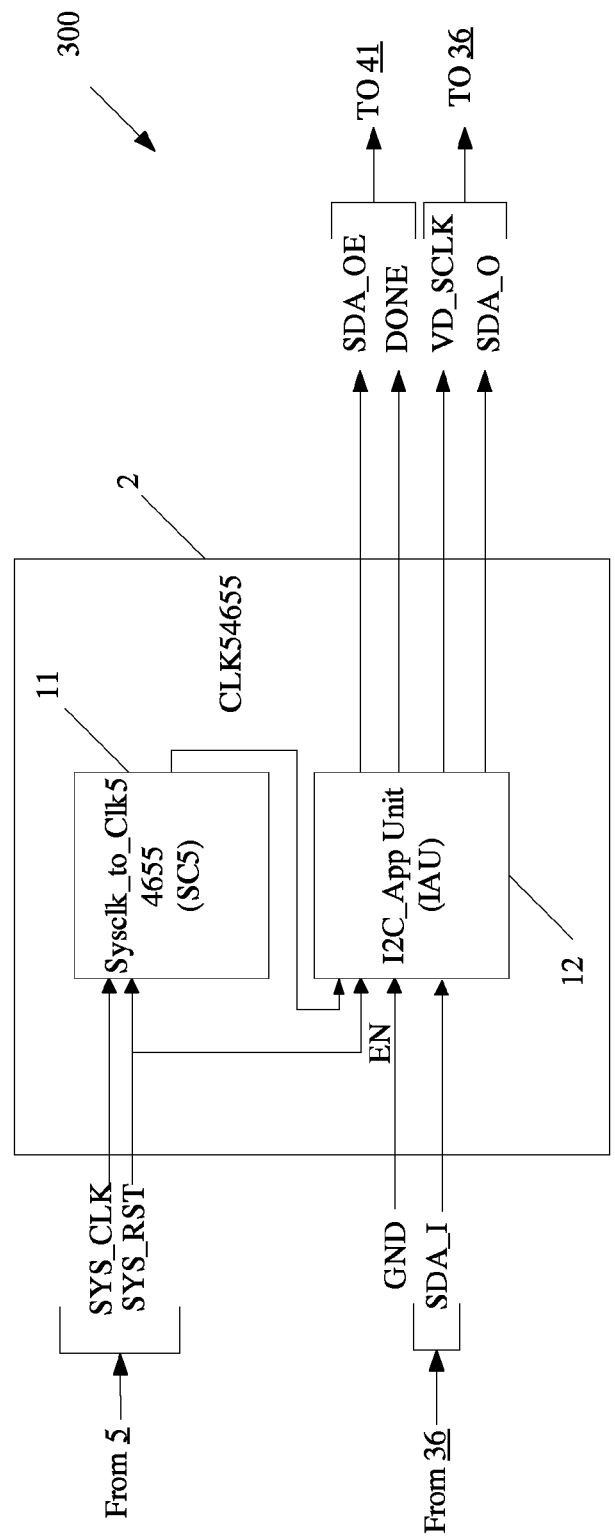
FIG. 3 is a circuit diagram including an I²C controller unit in accordance with an embodiment of the present invention.

FIG. 3 is a circuit diagram including an ICU 2 in accordance with an embodiment of the present invention. The ICU 2 can be configured to interface with and configure the VD 1. The ICU 2 can include a Sysclk_to_Clk54655 (SC5) Unit 11 and a I2C_App Unit (IAU) 12.

In various embodiments, one or more of the SC5 11 and/or the IAU 12 can be digital chips configured to perform the functions described herein. The SC5 Unit 11 and the IAU 12 can be coupled to one another for performing the functions of the ICU 2.

The SC5 11 can include one or more input ports communicatively coupled to one or more output ports from the CCU 5, and an output port communicatively coupled to an input port of the IAU 12. The SYS_CLK and SYS_RST input signals can be provided to the SC5 11. In some embodiments, the SC5 11 can convert the SYS_CLK signal at 27 MHz into a 54.655 KHz clock to drive the ICU 2 signals.

The IAU 12 can have one or more input ports communicatively coupled to one or more output ports from the CCU 5 and the VD 36, and one or more output ports communicatively coupled to input ports of the VD 36 and Reserved for Future Use (RFU) 41 pins.

The SYS_RST input signal can be provided to the IA12 from the CCU 5, the EN (enable) input signal can be provided from Ground and the SDA_I signal can be provided from the VD 36. The IAU 12 can transmit preset commands to configure the VD 36. In some embodiments, the preset commands can be the VD_SCLK and SDA_O command signals. The IAU 12 can transmit a DONE command signal, and an SDA_OE command signal to the RFU pins 41, and can transmit a VD_SCLK clock signal and a SDA_O command signal to the VD 36.

Figure 4:
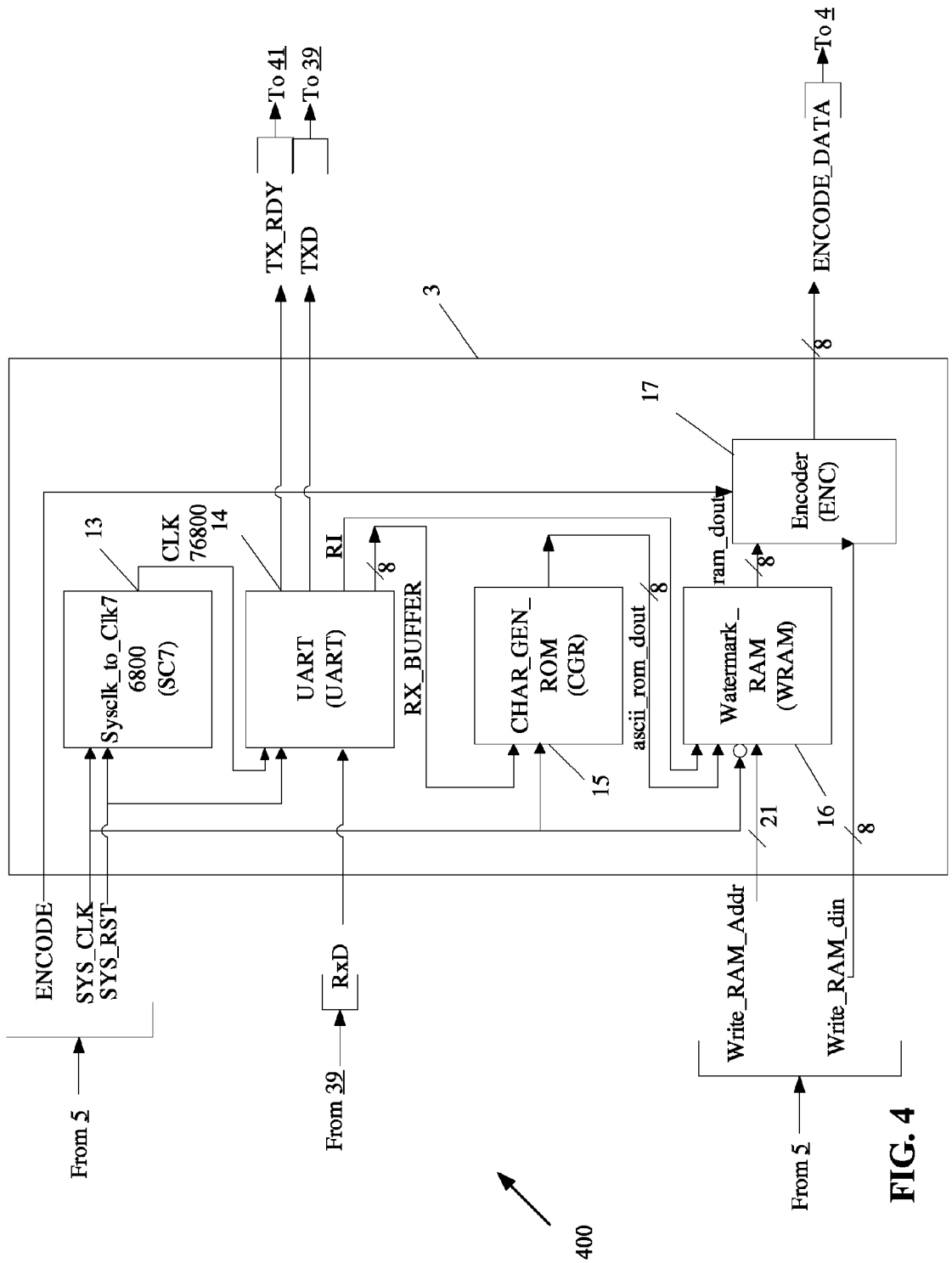
FIG. 4 is a circuit diagram including a watermark encoder in accordance with an embodiment of the present invention.

FIG. 4 is a circuit diagram including a WAE in accordance with an embodiment of the present invention. The WAE 3 can embed digital forensic data into a raw video frame. In some embodiments, the digital forensic data can be watermark bits.

The WAE 3 can include a Sysclk_to_Clk76800 Unit (SC7) 13, a Universal Asynchronous Receiver and Transmitter (UART) 14, a CHAR_GEN_ROM Unit (CGR) 15, a Watermark RAM (WRAM) 16 and an Encoder (ENC) 17. In various embodiments, one or more of the SC7 13, UART 14, CGR 15, WRAM 16 and/or ENC 17 can be digital chips configured to perform the functions described herein. The SC7 13, UART 14, CGR 15, WRAM 16 and/or ENC 17 can be coupled to one another for performing the functions of the WAE 3.

In the embodiment shown, the SC7 13 can have one or more input ports communicatively coupled to one or more output ports of the CCU 5. The SC7 13 can have one or more output ports communicatively coupled to one or more input ports of the UART 14.

The SC7 13 can receive the SYS_CLK and SYS_RST signals and convert the SYS_CLK signal to drive the UART 14 signals. The SC7 13 can output a CLK76800 clock signal to the UART 14. In some embodiments, the SC7 13 can convert an SYS_CLK signal at 27 MHz into a 76.8 KHz clock to drive the UART 14 signals.

The UART 14 can have one or more input ports communicatively coupled to one or more output ports of the CCU 5 and the FDG 39. The UART 14 can have one or more output ports communicatively coupled to one or more input ports of the RFU pins 41, FDG 39, WRAM 16 and the CGR 15.

The UART 14 can receive the SYS_RST signal configured to provide information for system reset. The UART 14 can receive the RXD signal from the FDG 39. The RXD signal can be a data signal at the UART 14. In some embodiments, the data can be one or more watermark bits, a watermark bitmap image, secret data or any data for embedding in raw video and/or image data. The UART 14 can continuously, or in some embodiments, continually, collect a sequence of watermark bits from the FDG 39.

The UART 14 can output the TXD signal to the FDG 39, and output the TX_RDY signal to an RFU pin 41. The TX_RDY signal can indicate that the UART 14 is ready to receive data from the FDG 39. The TXD signal can include data to be transmitted to the FDG 39. The 8-bit output signal ENCODE_DATA can be transmitted to the MMU 4 from the ENC 17.

The CGR 13 can have one or more input ports communicatively coupled to one or more output ports of the CCU 5 and UART 14. The CGR 13 can have one or more output ports communicatively coupled to one or more input ports of the WRAM 16. The CGR 13 can receive the SYS_CLK signal and the RX_BUFFER signal output from the UART 14. In some embodiments, the RX_BUFFER signal can include buffered watermark information. In some embodiments, the RX_BUFFER signal can be an 8-bit input signal.

The CGR 13 can convert the sequence of watermark bits in the form of binary or binary ASCII into a watermark binary image. The watermark binary image can be represented by a bitmap form using a unique mapping pattern not limited to a unique identity number of the device. In various embodiments, the CGR 13 can be a factory masked Read Only Memory (ROM) or a one-time user programmable fused ROM.

The WRAM 16 can have one or more input ports communicatively coupled to one or more output ports of the CCU 5 and the CGR 15, the UART 14. The WRAM 16 can have an output port communicatively coupled to an input port of the ENC 17. The WRAM 16 can include one or more Application Specific Processor RAMs (ASPRAMs) (not shown). One or more of the ASPRAMs can be 1024 bytes. The ASPRAM can be configured to temporarily store the watermark binary image output from the CGR 15.

The WRAM 16 can also receive the SYS_CLK signal, an ascii_rom_dout signal, and a Write_RAM_Addr signal. The WRAM 16 can output a ram_dout signal. The Write_RAM_Addr signal can provide information regarding a memory address associated with the watermark binary image. In some embodiments, the Write_RAM_Addr signal can be a 21-bit signal. The ascii_rom_dout signal can be an 8-bit signal, and the ram_dout signal can be an 8-bit signal.

The ENC 17 can have one or more input ports communicatively coupled to one or more output ports of the CCU 5. The ENC have an output port communicatively coupled to an input port of the MMU 4.

The ENC 17 can receive an ENCODE signal and a Write_RAM_din signal. The 8-bit input signal ram_dout can be input to the ENC 17 from the WRAM 16. The ram_dout and the Write_RAM_din signals can provide information regarding storage of the encoded data. ENC 17 can output the ENCODE_DATA signal to the MMU 4. The Write_RAM_din signal can be an 8-bit signal. The ENCODE_DATA signal can be an 8-bit signal.

The ENC 17 can embed the watermark binary image into the captured video frame to generate an ENCODE_DATA signal. The watermark binary image can be secret data in some embodiments. The ENCODE_DATA signal can be output from the ENC 17. In some embodiments, the captured video frame can be in the Y colour domain in which the sensitivity of the human visual system can be lower.

Figure 5A:
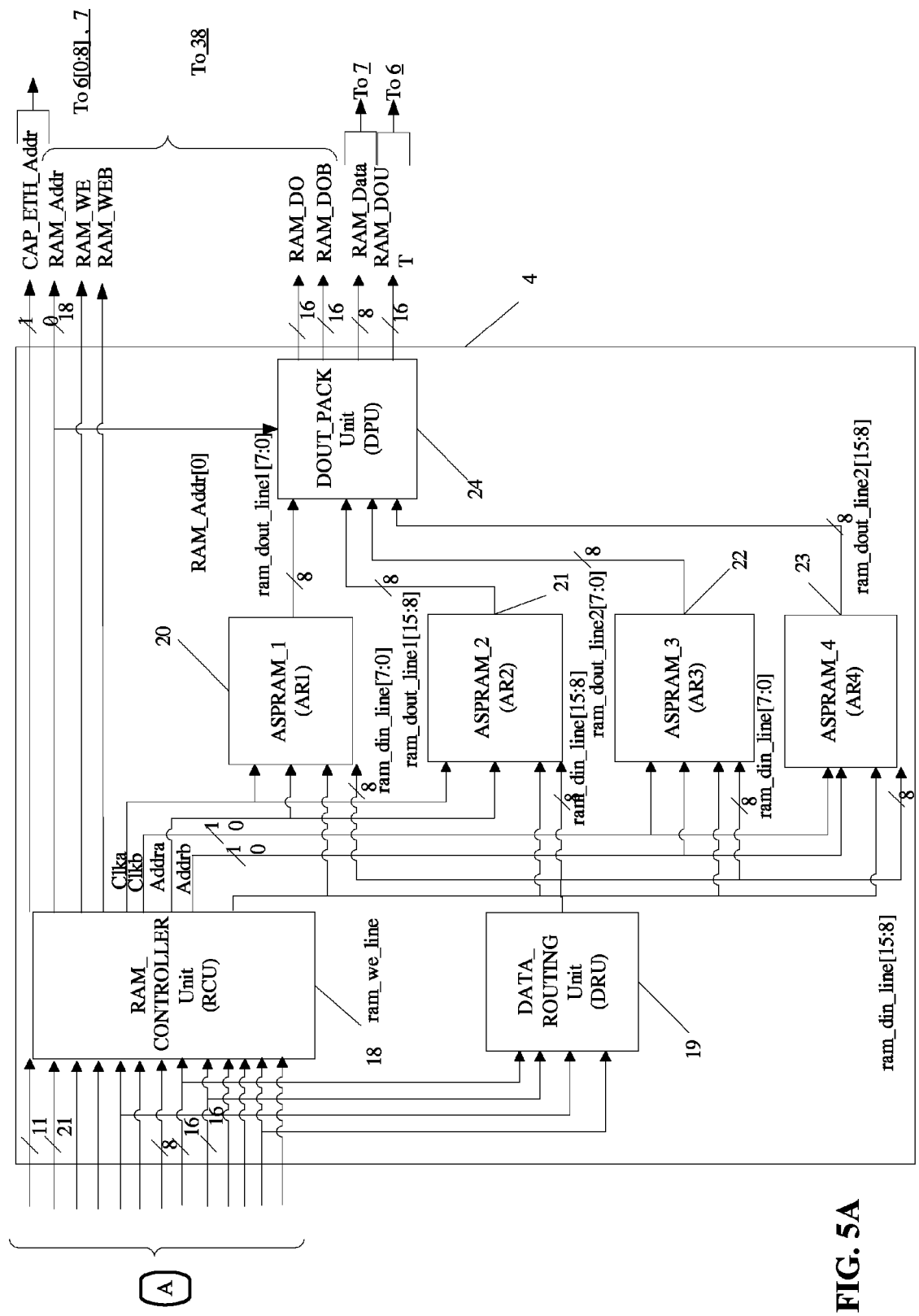

FIGS. 5A and 5B illustrate partial views of a circuit diagram including a memory management unit in accordance with an embodiment of the present invention. The MMU 4 can schedule the memory read/write process of one or more raw or stego-video frames. In some embodiments, the MMU 4 can schedule the memory read/write process of three raw or stego-video frames.

The MMU 4 can include a RAM_CONTROLLER Unit (RCU) 18, a DATA_ROUTING Unit (DRU) 19, a DOUT_PACK Unit (DPU) 24, ASPRAM_1 (AR1) 20, ASPRAM_2 (AR2) 21, ASPRAM_3 (AR3) 22 and/or ASPRAM_4 (AR4) 23. In various embodiments, one or more of the RCU 18, DRU 19, DPU 24, AR1 20, AR2 21, AR3 22, AR4 23 can be digital chips configured to perform the functions described herein. The can be coupled to one another for performing the functions of the MMU 4 described herein.

In the embodiment shown, the RCU 18 can include one or more input ports communicatively coupled to one or more output ports from the CCU 5, ECU 7, WAE 3, and the SRAM 38. The RCU 18 can include one or more output ports communicatively coupled to one or more input ports of the AR1 20, AR2 21, AR3 22, AR4 23.

The input signals RAM_Addr, Write_RAM_Addr, Write_RAM_WE, RAM_CLK, SYS_CLK, SYS_RST, OUTPUT_SEL and CAP_SEL of RCU can be transmitted from the CCU 5. In some embodiments, the RAM_Addr signal is an 11-bit signal and/or a Write_RAM_Addr signal is a 21-bit signal. The RAM_Addr and Write_RAM_Addr signals can include information for storage of the video and/or the stego-video.

The input signals ETH_RX_ODD and ETH_TX_EN can be transmitted from the ECU 7 to the RCU 18. The ETH_RX_ODD and the ETH_TX_EN signals can be for enabling Ethernet transmission and/or operation between the RCU 18 and the ECU 7.

The ENCODE_DATA signal can be transmitted from the WAE 3 to the RCU 18. The ENCODE_DATA signal can be an 8-bit signal in some embodiments.

The RAM_DI and RAM_DIB signals can be transmitted from the SRAM 38. The RAM_DI and RAM_DIB signals can include information related to the storage of the video and/or stego-video. The signals can be 8-bit and 16-bit signals, respectively, in some embodiments. The RCU 18 can schedule the read/write of raw video or stego-video from or to the SRAM (not shown) that is external to the DFC 110.

The CAP_ETH_Addr can be output to the VWD 6 and the ECU 7 from the RCU 18. The CAP_ETH_Addr signal can be a 10-bit signal and, in some embodiments, can be associated with the Ethernet address of information provided between the RCU 18, the VWD 6 and the ECU 7.

The RAM_Addr, RAM_WE and RAM_WEB signals can be transmitted to the SRAM 38 from the RCU 18. The signals can be 18-bit output signals in some embodiments.

The output signal RAM_Addr[0] of the RCU 18 can be also transmitted to the DPU 24 from the RCU 18. The output signals Clka, Clkb, 10-bit Addra, 10-bit Addrb and ram_we_line signals from the RCU 18 can be transmitted to each of the AR1 20, AR2 21, AR3 22, AR4 23.

The DRU 19 can include one or more input ports communicatively coupled to one or more output ports from the CCU 5, ECU 7, WAE 3, and the SRAM 38. The DRU 19 can include one or more output ports communicatively coupled to one or more input ports of the AR1 20, AR2 21, AR3 22, AR4 23.

The 16-bit input signals RAM_DI and 16-bit RAM_DIB to the DRU 19 can be transmitted from the SRAM 38. The input signal ETH_RX_ODD to the DRU 19 can be transmitted from the ECU 7. The input signal OUTPUT_SEL to the DRU 19 can be transmitted from the CCU 5. The 8-bit ram_din_line1[7:0], ram_din_line1[15:8], ram_din_line2[7:0], and ram_din_line2 [15:8] output signals from the DRU 19 can be transmitted to AR1 20, AR2 21, AR3 22, AR4 23, respectively.

The DRU 19 can temporarily separate and/or and store the video data and/or stego-video into the AR1 20, AR2 21, AR3 22, AR4 23. One or more of the AR1 20, AR2 21, AR3 22, AR4 23 can be 1024 byte size. The storage size can be designed to facilitate the watermark embedding process.

The DRU 19 can redirect the split video segment to the SRAM (not shown) or the VWD 6 or the ECU 7 in various formats. The formats can include, but are not limited to, full frame format for the VWD 6, interlaced frame format for the SRAM and/or split frame format for the ECU 7.

The DPU 24 can include one or more input ports communicatively coupled to one or more output ports from the CCU 5, AR1 20, AR2 21, AR3, 22, AR4 23. The DPU 24 can include one or more output ports communicatively coupled to one or more input ports of the ECU 7, VWD 6 and SRAM 38.

The ram_dout_line1[7:0], ram_dout_line1[15:8], ram_dout_line2[7:0], and ram_dout_line2 [15:8] input signals to the DPU 24 can be transmitted from AR1 20, AR2 21, AR3 22, AR4 23. The 16-bit RAM_DO and 16-bit RAM_DOB signals from the DPU 24 can be transmitted to the SRAM 38. The 8-bit RAM_Data and 16-bit RAM_DOOUT signals from the DPU 24 can be transmitted to the ECU 7 and the VWD 6, respectively. The signals can provide information and/or commands associated with the storage of the raw video and/or stego-video.

Figure 6:
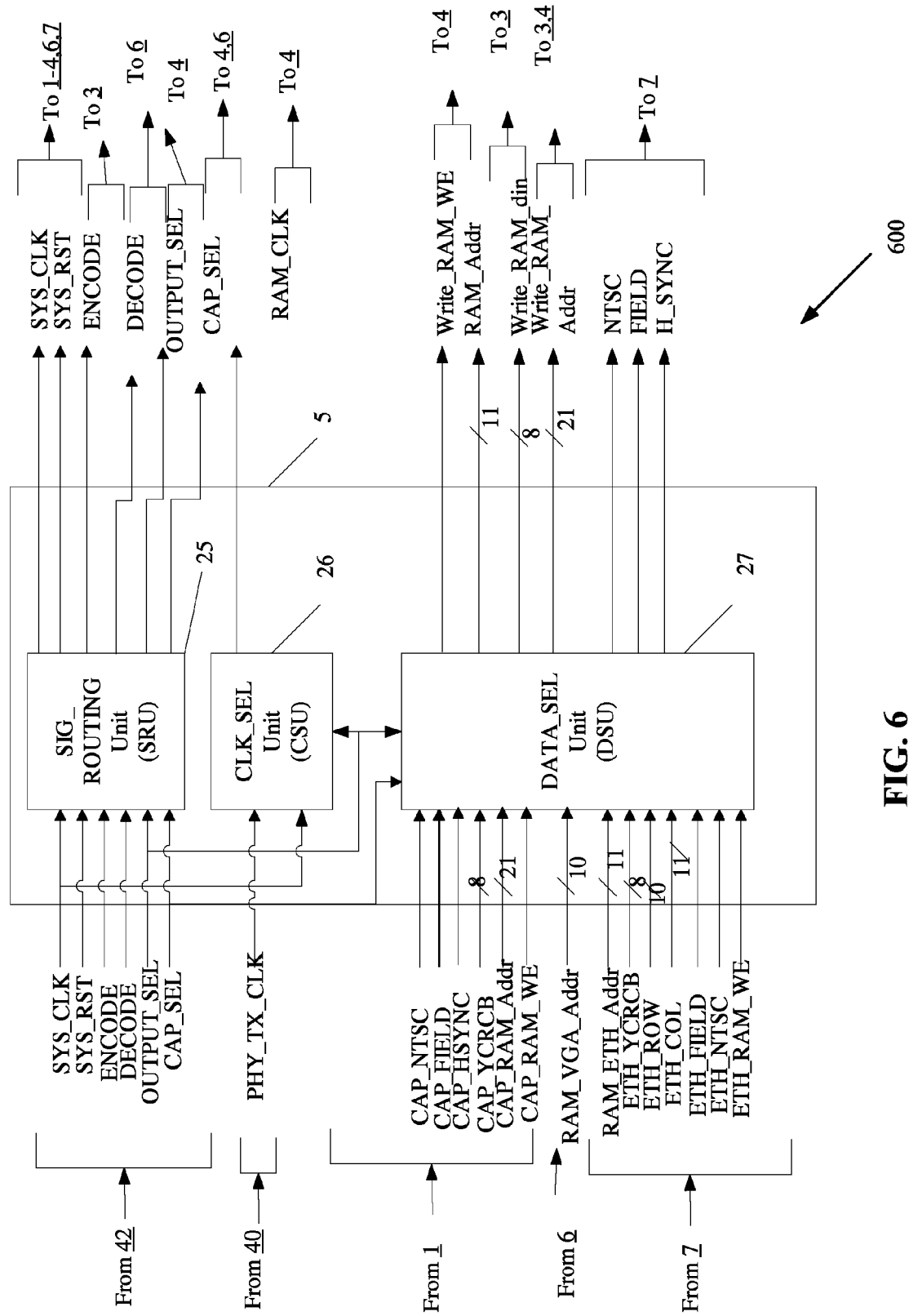
FIG. 6 is a circuit diagram including a central controller unit in accordance with an embodiment of the present invention.

FIG. 6 is a circuit diagram including a CCU in accordance with an embodiment of the present invention. The CCU 5 can synchronize the operations of the VDC 1, the ICU 2, the WAE 3, the MMU 4, the VWD 6, the ECU 7 and/or the ET 40. The CCU can synchronize the operations of the aforementioned components by receiving and/or transmitting control signals and raw or stego-video data.

The CCU 5 can include a SIGNAL_Routing Unit (SRU) 25, a CLK_SEL Unit (CSU) 26 and a DATA_SEL Unit (DSU) 27. In various embodiments, one or more of the SRU 25, CSU 26 and/or DSU 27 can be digital chips configured to perform the functions described herein.

The SRU 25 can have one or more input ports communicatively coupled to one or more output ports of external switches (not shown). The SRU 25 can have one or more output ports communicatively coupled to one or more input ports of the VDC 1, the ICU 2, the WAE 3, the MMU 4, the CCU 5, the VWD 6, and the ECU 7.

The SRU 25 can re-direct the external switch signals to other computational units in the CCU 5 and/or coordinate the sequence of operations for the CCU 5.

The SYS_CLK, SYS_RST, ENCODE, DECODE, CAP_SEL and OUTPUT_SEL signals to the SRU 25 can be transmitted from external switches 42. The output signals SYS_CLK and SYS_RST from the SRU 25 can be transmitted to the VDC 1, ICU 2, WAE 3, MMU 4, VWD 6 and ECU 7.

The ENCODE signal output from the SRU 25 can be transmitted to the WAE 3. The DECODE signal and the CAP_SEL signal output from the SRU 25 can be transmitted to the VWD 6. The CAP_SEL and OUTPUT_SEL output signals of the SRU 25 can be transmitted to the MMU 4.

The CSU 26 can have one or more input ports communicatively coupled to one or more output ports of external switches (not shown) and the ET 40. The CSU 26 can have one or more output ports communicatively coupled to one or more input ports of the MMU 4 and the VWD 6. The CSU 26 can exchange information with the DSU 27 using other ports of the CSU 26. The CSU 26 can generate a RAM_CLK signal for SRAM read/write operations.

The SYS_CLK and OUT_SEL input signals to the CSU 26 can be transmitted from external switches 42. The PHY_TX_CLK input signal of the CSU 26 can be transmitted from the ET 40. The RAM_CLK output signal from the CSU 26 can be transmitted to the MMU 4.

The DSU 27 can have one or more input ports communicatively coupled to one or more output ports of the VDC 1, the VWD 6, and the ECU 7. The DSU 27 can have one or more output ports communicatively coupled to one or more input ports of the MMU 4, the WAE 3, and the ECU 7. The DSU 27 can exchange information with the CSU 26 using other ports of the DSU 27. The DSU 27 can multiplex and re-direct the capture signals from the VDC 1 or the VWD 6 or the ECU 7 to other computation units in the CCU 5.

The CAP_NTSC, 8-bit CAP_YCRCB, CAP_FIELD, CAP_HYSNC, 21-bit CAP_RAM_Addr and CAP_RAM_WE signals to the DSU 27 can be transmitted from VDU 1. The 11-bit RAM_ETH_Addr, 8-bit ETH_YCRCB, 10-bit ETH_ROW, 11-bit ETH_COL, ETH_FIELD, ETH_NTSC and ETHRAM_WE input signals to the DSU 27 can be transmitted from the ECU 6. The CAP_SEL and OUTPUT_SEL input signals to the DSU 27 can be transmitted from external switches 42.

The Write_RAM_WE and 11-bit RAM_Addr signals from the DSU 27 can be transmitted to MMU 4. The 21-bit Write_RAM_Addr signal from the DSU 27 can be transmitted to the MMU 4 and the WAE 3. The NTSC, FIELD, H_SYNC output signals from the DSU 27 can be transmitted to the ECU 7.

Figure 7:
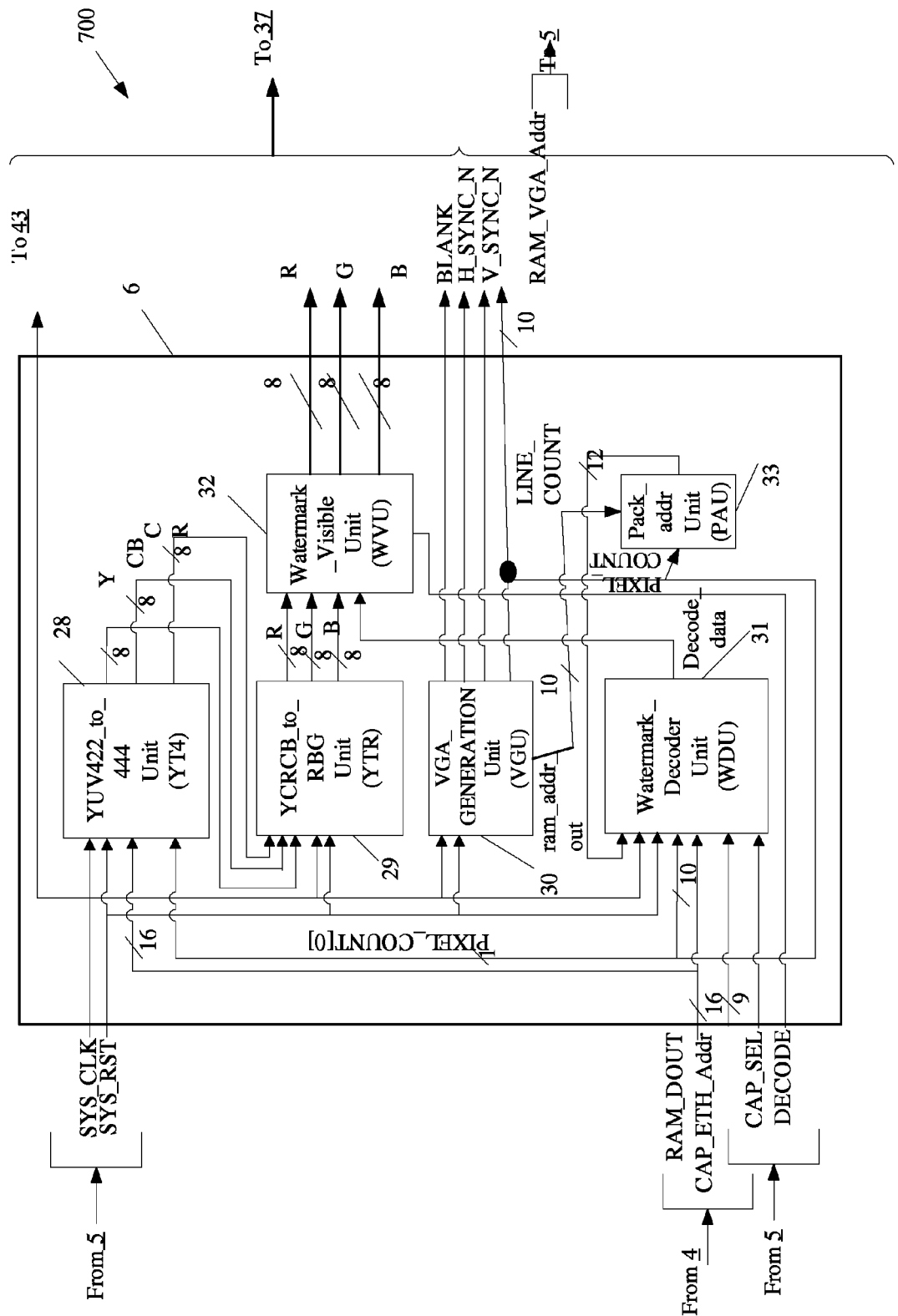
FIG. 7 is a circuit diagram including a video graphics array/watermark decoder in accordance with an embodiment of the present invention.

FIG. 7 is a circuit diagram including a VWD in accordance with an embodiment of the present invention. The VWD 6 can provide an interface to the VGAC 37. The VGAC 37 can control the video display and/or decoding the stego-video into a watermark at the VWD 6. The watermark can be visible as a picture-in-picture video.

The VWD 6 can include a YUV422_to_444 Unit (YT4) 28, a YCRCB_to_RBG Unit (YTR) 29, a VGA_GENERATION Unit (VGU) 30, a Watermark_Decoder Unit (WDU) 31, a Watermark_Visible Unit (WVU) 32, and a Pack_addr Unit (PAU) 33. In various embodiments, one or more of the YT4 28, YTR 29, VGU 30, WDU 31, WVU 32 and/or PAU 33 can be digital chips configured to perform the functions described herein. The YT4 28, the YTR 29, a VGU 30, the WDU 31, the WVU 32, and the PAU 33 can be coupled to one another for performing the functions of the VWD 6 described herein.

In the embodiment shown, the YT4 28 can have one or more input ports communicatively coupled to one or more output ports of the CCU 5, the pixel clock 43, the MMU 4 and the VGU 30. The YT4 28 can have one or more output ports communicatively coupled to one or more input ports of the YTR 29. The YT4 28 can convert a video in a YUV422 format into a YCrCb format.

The YTR 29 can have one or more input ports communicatively coupled to one or more output ports of the CCU 5, YT4 28, a pixel clock 43. The YTR 29 can have one or more output ports communicatively coupled to one or more input ports of the WVU 32. The YTR 29 can convert the video in a YCrCb format into a composite sync RGB format. The converted video can be provided to the WVU 32.

The VGU 30 can have one or more input ports communicatively coupled to one or more output ports of the CCU 5, and the pixel clock 43. The YTR 29 can have one or more output ports communicatively coupled to one or more input ports of the CCU 5. The VGU 30 can generate a composite sync video control signal. The signals can include BLANK, H_SYNC_N, V_SYNC_N signals in NTSC format. The signals can be provided to the CCU 5.

The WDU 31 can have one or more input ports communicatively coupled to one or more output ports of the CCU 5, the PAU 33, the MMU 4, and the pixel clock 43. The WDU 31 can have one or more output ports communicatively coupled to one or more input ports of the WVU 32. The WDU 31 can extract the watermark bit-map sequence from the stego-video. The WVU 32 can overlay the watermark image onto the raw video using a picture-in-picture format. The Pack_addr Unit 33 can combine the row and column information to form a RAM address mapping to extract the watermark image sequence.

The SYS_CLK and SYS_RST input signals can be transmitted to the YT4 28, the YTR 29, the VGU 30 and the WDU 31 from the CCU 5. The 16-bit RAM_DOUT signal can be transmitted to the YT4 28 and the WDU 31 from the MMU 4. The PIXEL_COUNT[0] signal can be transmitted to the YT4 28 from the VGU 30.

The 8-bit Y, 8-bit CB and 8-bit CR signals can be transmitted from the YT4 28 to the YTR 29. The 8-bit R, 8-bit G and 8-bit B signals can be transmitted from the YTR 29 to the WVU 32.

The Decode_data signal can be transmitted from the WDU 31 to the WVU 32, and the DECODE signal can be transmitted from the CCU 5 to the WVU 32. The 8-bit R, 8-bit G and 8-bit B signals can be transmitted to the external VGAC 37 from the WVU 32.

The output signals BLANK, H_SYNC_N, V_SYNC_N can be transmitted from the VGU 30 to the external VGAC 37. The 10-bit RAM_VGA_Addr signal (or PIXEL_COUNT (internal name) signal) can be transmitted from the VGU 30 to the CCU 5, WDU 31 and PAU 33. The 10-bit LINE_COUNT signal can be transmitted from the VGU 30 to the PAU 33. The 12-bit ram_addr_out signal can be transmitted from the PAU 33 to the WDU 31.

The 9-bit CAP_ETH_Addr signal can be transmitted to the WDU 31 from the MMU 4. The CAP_SEL signal can be transmitted to the WDU 31 from the CCU 5. The PIXEL_CLK signal (or the SYS_CLK signal (internal name)) can be transmitted from the VWD to the VGAC 37.

Figure 8:
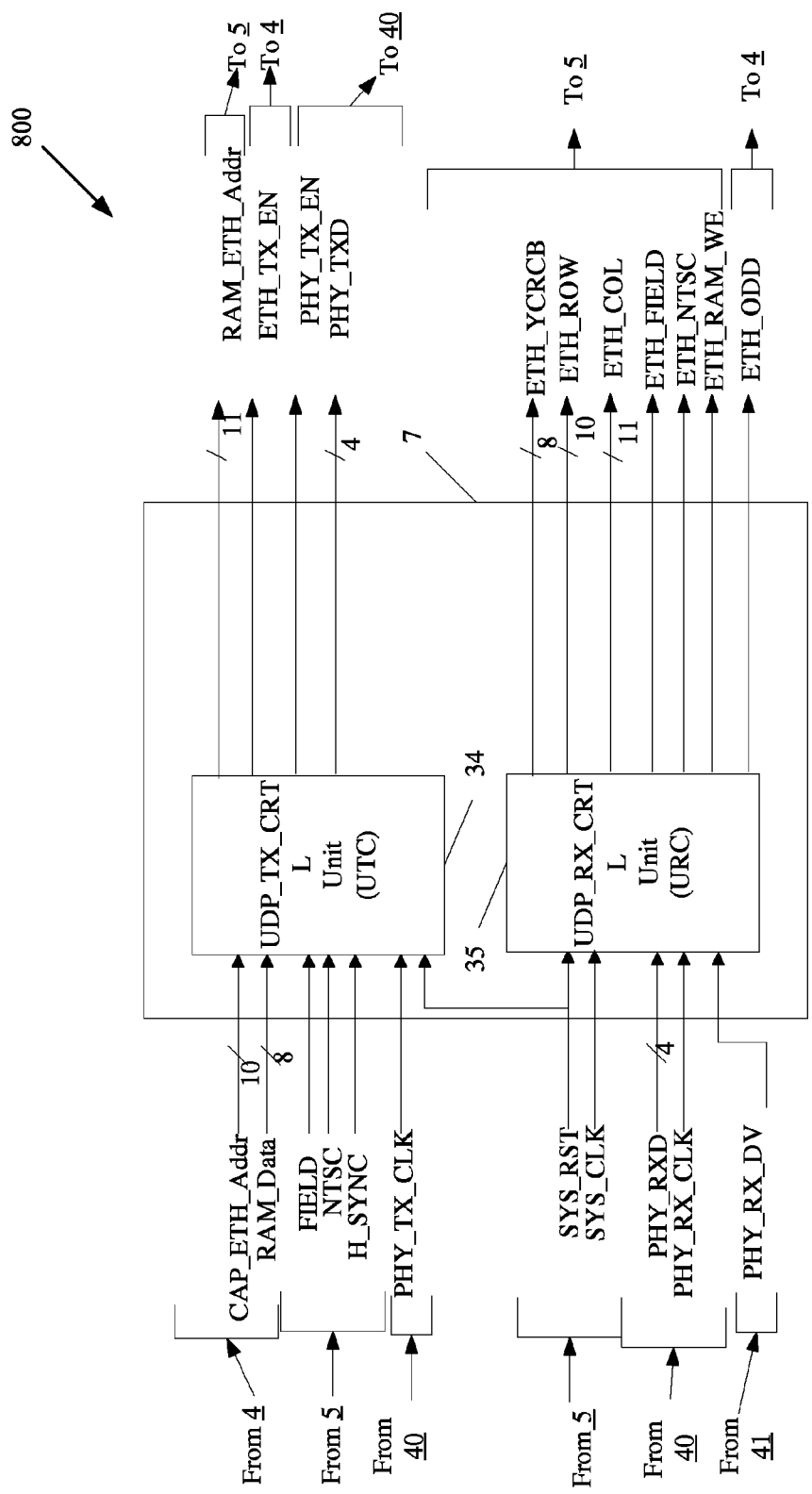
FIG. 8 is a circuit diagram including an Ethernet controller unit in accordance with an embodiment of the present invention.

FIG. 8 is a circuit diagram including an ECU in accordance with an embodiment of the present invention. The ECU 7 can interface with a single port 10/100 megabytes per second (Mbps) PHY ET 40.

The ECU 7 can include a UDP_TX_CRTL Unit (UTC) 34 and a UDP_RX_CRTL Unit (URC) 35. In various embodiments, one or more of the UTC 34 and/or URC 35 can be digital chips configured to perform the functions described herein. The UTC 34 and/or the URC 35 can be coupled to one another for performing the functions of the VWD 6 described herein.

The UTC 34 can have one or more input ports communicatively coupled to one or more output ports of the CCU 5, the MMU 4, and the ET 40. The UTC can have one or more output ports communicatively coupled to one or more input ports of the CCU 5, MMU 4 and the ET 40.

The UTC 34 can be configured to receive video data and convert the video data into a User Datagram Protocol (UDP) datagram. The URC 35 can be configured to receive the UDP datagram from the Internet, store the video information in the datagram, and convert the video information into video decoder format. In some embodiments, the video decoder format can be a YCrCb format.

The inputs 10-bit CAP_ETH_Addr and 8-bit RAM_Data signals to the UTC 34 can be transmitted from the MMU 4. The input signals SYS_CLK, HELD, NTSC and H_SYNC can be transmitted to the UTC 34 from the CCU 5. The input signal PHY_TX_CLK can be transmitted to the UTC 34 from the ET 40.

The 11-bit RAM_ETH_Addr output signal from the UTC 34 can be transmitted to the CCU 5. The ETH_TX_EN output signal from the UTC 34 can be transmitted to the MMU 4. The PHY_TX_EN and the 4-bit PHY_TXD output signals from the UTC 34 can be transmitted to the ET 40.

The URC 35 can have one or more input ports communicatively coupled to one or more output ports of the CCU 5, the RFU pins 41 and the ET 40. The URC 35 can have one or more output ports communicatively coupled to one or more input ports of the CCU 5 and the MMU 4.

The input signals SYS_CLK and SYS_RST to the URC 35 can be transmitted from the CCU 5. The input signals PHY_RX_CLK and the 4-bit PHY_RXD to the URC 35 can be transmitted from the ET 40. The input signal PHY_RX_DV to the URC 35 can be transmitted from the RFU pins 41.

The 11-bit ETH_COL, 10-bit ETH_ROW, 8-bit ETH_Y-CRCB, ETH_FIELD, ETH_NTSC and ETH_RAM_WE output signals can be transmitted from the URC 35 to the CCU 5. The output signal ETH_ODD can be transmitted from the URC 35 to the MMU 4.

To reduce the likelihood of data modification during the transmission and/or receipt of information via the UDP protocol, the ECU 7 can be configured to manipulate and transmit the data through the communication path in the form of scrambled secure information. The scrambled secure information can be generated based on protocols for scrambling information. A reversal process in the receiver can convert the scrambled secure information. The forensic information can then be extracted. The manipulating of data can be in the form of security conversion or in other form of data communication protocols such as mobile or optical.

Figure 9:
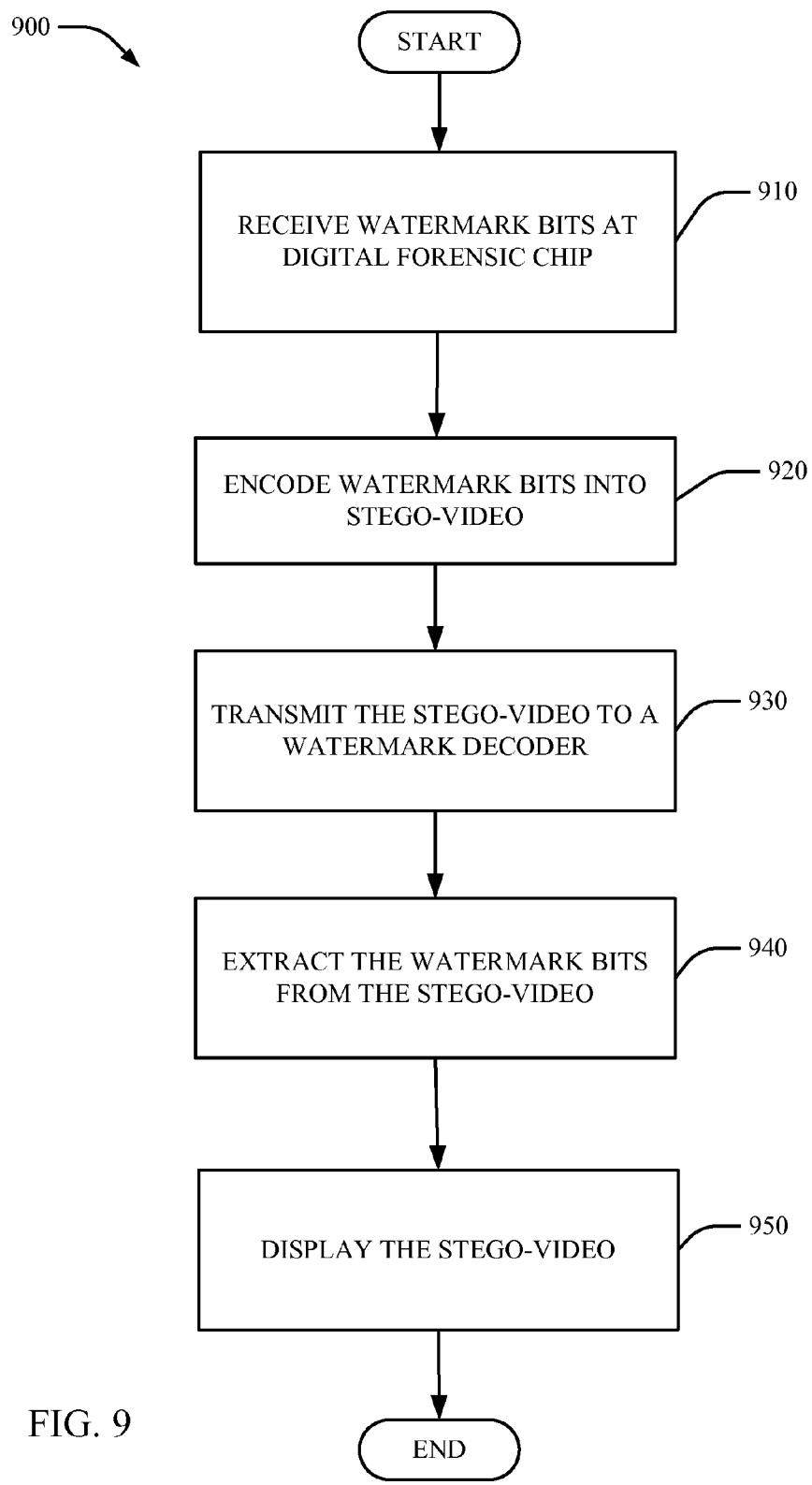
FIG. 9 is a flowchart of a method of operation of a digital forensic chip in accordance with an embodiment of the present invention.

FIG. 9 is a flowchart of a method of operating a digital forensic chip system in accordance with embodiments described herein. At 910, method 900 can include the DFC 110 receiving watermark bits. The watermark bits can be received from a source external to the digital forensic chip. For example, the watermark bits can be received from a FDG 39 configured to generate watermark bits.

At 920, method 900 can include encoding the watermark bits into stego-video. In some embodiments, the watermark bits can be encoded into digital watermarked video in which the watermark bits are invisible and/or hidden.

In some embodiments, the WAE 3 can encode the watermark bits. For example, the WAE 3 can be configured to receive watermark bits from the FDG 39. The WAE 3 can then encode the watermark bits into a stego-video or digital watermarked video in which the watermark bits are invisible.

In some embodiments, encoding the watermark bits can be embedding the watermark bits in raw video to form stego-video. Methods including those described with reference to FIGS. 10 and 11 can be employed for encoding or embedding the watermark bits.

Referring back to FIG. 9, at 930, method 900 can include the stego-video being transmitted to a watermark decoder. In some embodiments, the watermark decoder can be the VWD 6.

The stego-video can be transmitted to the watermark decoder after being stored at a memory of the digital forensic chip in some embodiments. In some embodiments, the memory is the MMU 4.

In some embodiments, the stego-video can be stored at a location remote from the MMU 4 (and the DFC 110) via the functionality of the ET 40 and/or the ECU 7. For example, the ET 40 can retrieve stego-video from a location remote from the MMU 4 (and the DFC 110) and provide the stego-video to the DFC 110 via the ECU 7. The ET 40 and the ECU 7 can utilize UDP protocols for providing the stego-video in some embodiments.

At 940, method 900 can include extracting the watermark bits from the stego-video. The VWD 6 can extract the watermark bits in some embodiments. In various embodiments, the watermark bits can be extracted in real-time.

At 960, method 900 can include displaying the stego-video. The stego-video can be displayed by the VWD 6 and/or the VGAC 37. While the VWD 6 is described as a combination VGA and watermark decoder, in various embodiments, the VWD 6 can perform one or more of the display, extraction and/or decoding functions described herein. Further, in some examples, the VGA of the VWD 6 can be a separate module, digital chip and/or entity from the watermark decoder.

In some embodiments (not shown), the method 900 can also include other operations performed by the ECU 7 and/or ET 40 for remote access, storage or display of the stego-video, raw video and/or one or more watermark bits or watermark bitmap images. In some embodiments, the ECU 7 can operate in a fast UDP mode to provide interfaces to the ET 40 for remote access, storage and/or display.

In some embodiments (not shown), the method 900 can also include operations performed by the CCU 5 for control of the DFC 110 and/or one or more components within or communicatively coupled to the DFC 110.

The method 900 can be performed in real-time and/or in online or offline modes. The method 900 can be performed on any number of different types of information, including, but not limited to, document, video and/or image or other static information.

While not shown in FIG. 9, with reference to FIG. 1, another embodiment of the operation of the DFC can be as described below. The DFC can also receive, store and/or display raw data as compared to receiving, storing and/or displaying watermark bits and/or stego-video. For example, raw video data can be received at the VDC 1 of the DFC 110 from the VD 36. The VD 36 can be external to the DFC 110. The raw data can be received and/or stored at the memory of the DFC. In some embodiments, the memory can be the MMU 4. In some embodiments, the raw data can be stored at a location remote from the MMU 4. The raw data can be displayed by a VGA portion of the VWD 37 or, in some embodiments, by the VGAC 37. The VGA portion can be controlled by the VGAC 37.

The ICU 2 can be communicatively coupled to the VD 36 via a serial interface. The ICU 2 can configure the functionality of the VD 36 over the serial interface. For example, the ICU 2 can configure the VD 36 to provide video to the DFC 110 in one of a number of different types of formats.

The MMU 4 can be configured to receive raw data from the VDC 1. The raw video data can be received from the VDC 1 via the CCU 5. The CCU 5 can be configured to synchronize the operations of other video manipulating units by receiving and sending out control signals and raw video data.

The MMU 4 can temporarily store the raw video data in the static SRAM 38, which is external to the DFC 110. The MMU 4 can transmit the raw video to the VMD 6. In some embodiments, the MMU 4 can transmit the raw to the ECU 7 for storage or display at a location remote from the DFC 110. The VWD 6 can provide an interface to the VGAC 37 for display of the raw video data. The ECU 7 can operate in a fast UDP mode to provide interfaces to the ET 40 for remote access, storage and/or display of the raw video data.

The method can be performed in real-time and/or in online or offline modes. The method can be performed on any number of different types of information, including, but not limited to, document, video and/or image or other static information.

Figure 10:
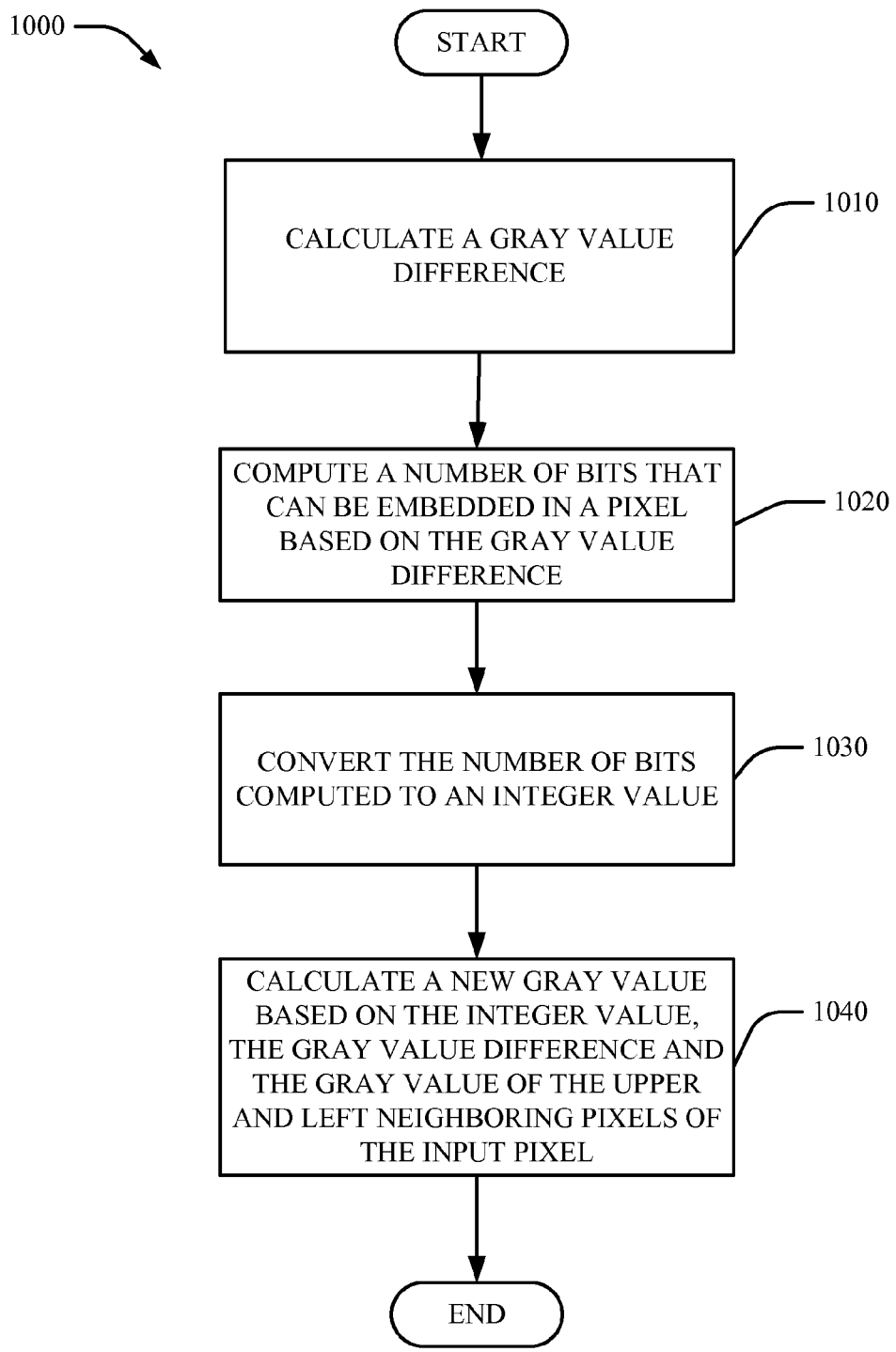
FIGS. 10 and 11 are flowcharts of methods of embedding data in accordance with embodiments of the present invention.

FIG. 10 is a flowchart of a method of embedding data in accordance with embodiments described herein. With reference to FIGS. 1 and 9, the method 1000 can be performed by the WAE 3 to embed watermark bits in data in some embodiments.

At 1010, a gray value difference, d, can be calculated. The gray value difference can be calculated for an input pixel, Px. The gray value of the input pixel, $g_x$ can be determined, and the gray values of the upper pixel (relative to the input pixel) and the gray value of the left pixel (relative to the input pixel) can be determined.

An average of the sum of the gray values of the upper pixel and the left pixel can be computed. A difference between the average and the gray value of the input pixel can be determined to be the gray value difference as shown below.

$$d = (g_u + g_l)/2 - g_x$$

At 1020, a number of bits, n, which can represent a number of bits that can be embedded in a pixel, $P_x$, can be computed. The number of bits, n, can be computed according to the following equation.

$$n = \begin{cases} 1, & \text{if } -1 \leq d \leq 1 \\ \log_2 |d|, & \text{if } d > 1 \text{ or } d < -1 \end{cases}$$

As shown, the number of bits can be equal to one if the gray value difference is between or equal to minus one and plus one, and the number of bits can be equal to a log value of the gray value difference if the gray value difference is greater than one or less than minus one.

At 1030, n bits of secret data can be converted into an integer value, b. At 1040, a gray value, $g_x$, can be changed to a new gray value, $\bar{g}_x$, according to the following:

$$\bar{g}_x = \begin{cases} (g_u + g_l)/2 - b, & \text{if } 0 \le d \le 1 \\ (g_u + g_l)/2 + b, & \text{if } d = -1 \\ (g_u + g_l)/2 - 2^n - b, & \text{if } d > 1 \\ (g_u + g_l)/2 + 2^n + b, & \text{if } d < 1 \end{cases}$$

The new gray value can be the gray value of the stego-video embedded with the secret data.

The method can be performed in real-time and/or in online or offline modes. The method can be performed on any number of different types of information, including, but not limited to, document, video and/or image or other static information.

Figure 11:
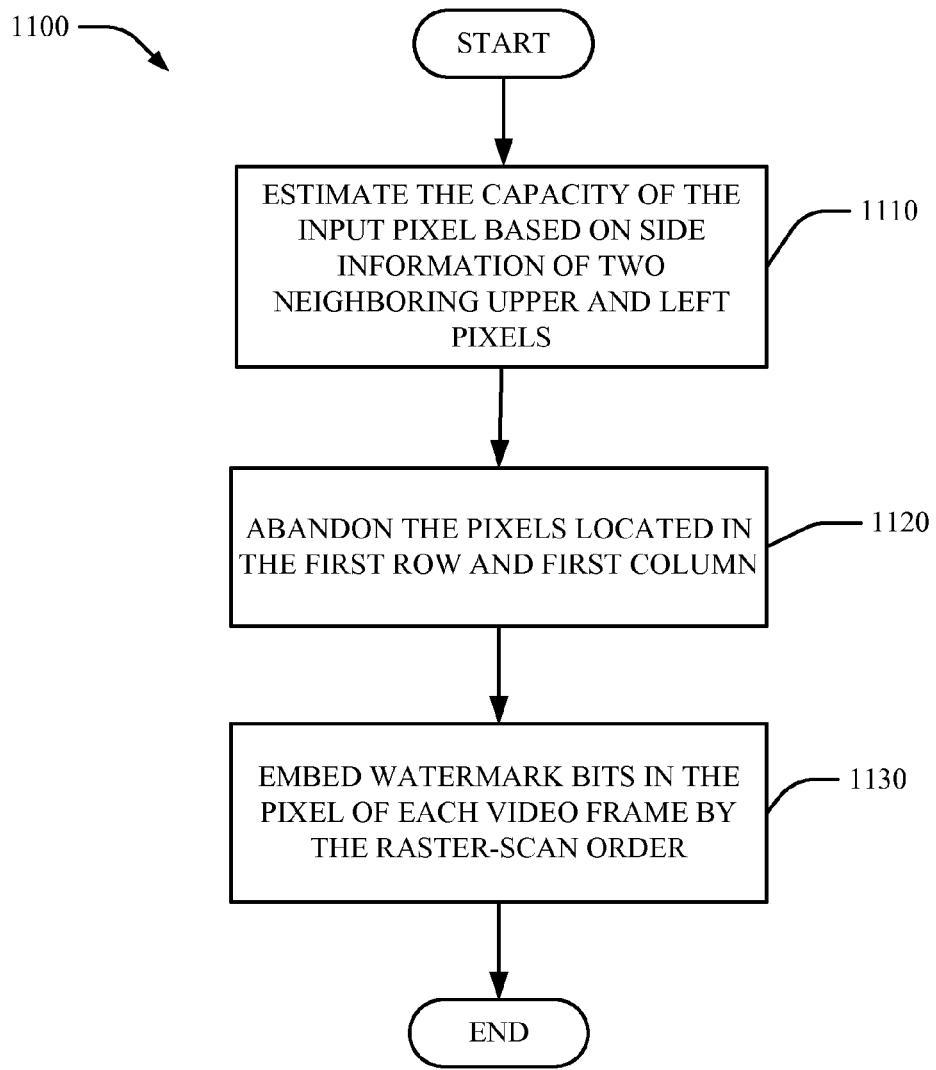

FIG. 11 is a flowchart of a Least Significant Bit (LSB) substitution method for watermark embedding according to embodiments described herein. By defining $P_U$ and $P_L$ as the upper and left neighboring pixels of the input pixel $P_x$ and $g_u$, $g_l$ and $g_x$ as the gray value of the upper pixel $P_U$, left pixel $P_L$ and input pixel $P_x$ respectively, the method 900 can be performed as follows in the ENC 17.

At 1110, method 1100 can include estimating the capacity of the input pixel $P_x$ based on side information of two neighboring pixels $P_U$ and $P_L$. At 1120, method 1100 can include abandoning the pixels located in the first row and first column. At 1130, method 1100 can include embedding a watermark bits in the pixel of each video frame by the raster-scan order.

Figure 12:
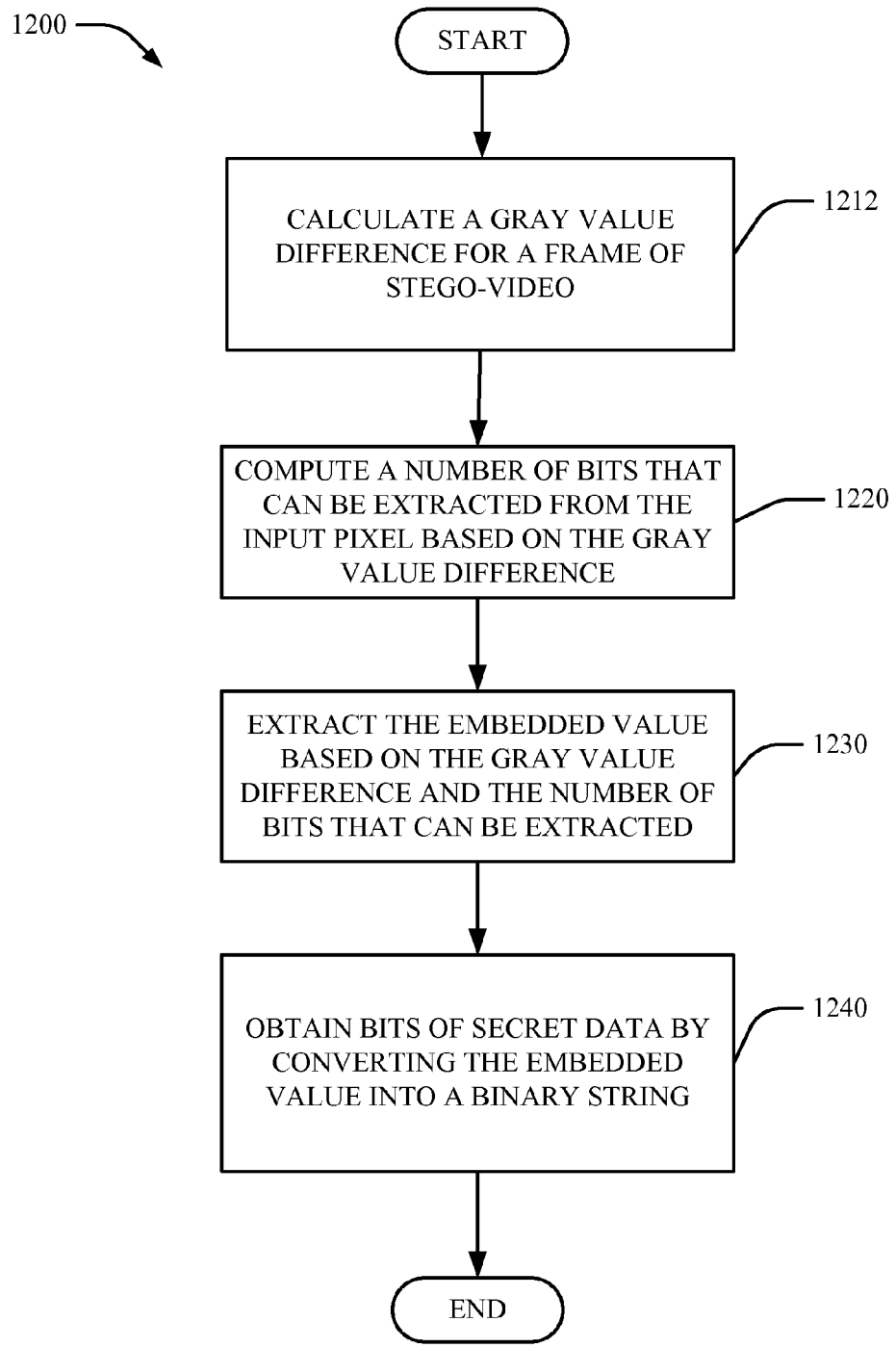
FIG. 12 is a flowchart of a method of extracting a watermark in accordance with an embodiment of the present invention.

FIG. 12 is a watermark extraction scheme according to embodiments described herein. Referring to FIGS. 7 and 12, the WDU 31 can implement the watermark extraction scheme. The embedded watermark bits can be extracted from each frame of the stego-video by the raster-scan order. The pixels located in the first row and first column can be abandoned. By defining $P_U'$ and $P_L'$ as the upper and left neighboring pixels of the input pixel $P_x'$ and $g_u'$, $g_l'$ and $g_x'$ as the gray value of the upper pixel $P_U'$, left pixel $P_L'$ and input pixel $P_x'$, respectively, the method 1100 can be performed as follows.

At 1210, method 1200 can include calculating the gray value difference, d', as follows:

$$d' = (g_u' + g_l')/2 - g_x'.$$

At 1220, method 1200 can include computing a number of bits, n', that can be extracted from the input pixel, $P_x'$. The number of bits, n', can be computed as follows:

$$n' = \begin{cases} 1, & \text{if } -1 \le d' \le 1; \\ \log_2 |d'|, & \text{if } d' > 1 \text{ or } d' < -1. \end{cases}$$

At 1230, method 1200 can include extracting the embedded value b. The embedded value, b, can be extracted as follows:

$$b = \begin{cases} d', & \text{if } 0 \le d' \le 1; \\ -d', & \text{if } d' = -1; \\ d' - 2^{n'}, & \text{if } d' > 1; \\ -d' - 2^{n'}, & \text{if } d' < -1. \end{cases}$$

At 1240, method 1200 can include obtaining n' bits of secret data by converting the value b into a binary string.

In the falling-off-boundary checking process done in both the data embedding and extraction processes, there can be four cases for which the new gray value $\bar{g}_x$ falls off the boundary of the range [0, 255]:

(i) $(g_u+g_l)/2<1$ and $0\le d\le 1$,
(ii) $(g_u+g_l)/2>254$ and $d=-1$,
(iii) $(g_u+g_l)/2<2^{n+1}-1$ and $d>1$,
(iv) $(g_u+g_l)/2+2^{n+1}>256$ and $d<-1$.

The method 1200 can be performed in real-time and/or in online or offline modes. The method 1200 can be performed on any number of different types of information, including, but not limited to, document, video and/or image or other static information.

In one or more of the embodiments described herein, the DFC 110, and/or one or more components thereof, can be operated according to non-real-time techniques. In some embodiments, the DFC 110, and/or one or more components thereof, can be operated in online and/or offline modes. In some embodiments, the DFC 110, and/or one or more components thereof, can be employed for video and/or for image applications, digital video recorder devices, applications and/or the digital video recording industry, in general, and/or the forensic industry, in general. In some embodiments, the DFC 110, and/or one or more components thereof, can be utilized for static image applications as well as the above-described video applications.

It can be to be understood that the embodiments described herein can be implemented in hardware, software or a combination thereof. For a hardware implementation, the embodiments (or modules thereof) can be implemented within one or more application specific integrated circuits (ASICs), mixed signal circuits, digital signal processors (DSPs), digital signal processing devices (DSPDs), programmable logic devices (PLDs), field programmable gate arrays (FPGAs), processors, controllers, micro-controllers, microprocessors and/or other electronic units designed to perform the functions described herein, or a combination thereof.

When the embodiments can be implemented in software, firmware, middleware or microcode, program code or code segments, they can be stored in a machine-readable medium (or a computer-readable medium), such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments can be possible. Accordingly, the described embodiments can be intended to embrace all such alterations, modifications and variations that fall within the spirit and scope of the appended claims. Furthermore, to the extent that the term "includes" can be used in either the detailed description or the claims, such term can be intended to be inclusive in a manner similar to the term "comprising" as "comprising" can be interpreted when employed as a transitional word in a claim.

What can be claimed is:

1. A digital chip, comprising:
a watermark encoder configured to:
receive one or more watermark bits and a raw video frame; and
generate a stego-video, wherein generation of the stego-video comprises:
calculation of a gray value difference of a pixel relative to a gray value of an input pixel in the raw video frame;
determination of a number of bits that are capable of being embedded in the input pixel,
wherein, in response to the gray value difference being determined to be within a first set of values, the number of bits is a first value determined based on a logarithmic function of the gray value difference,
wherein, in response to the gray value difference being determined to be within a second set of values, the number of bits is a second value,
wherein the second set of values comprises a first range from a first gray value difference metric to a negative version of the gray value difference metric,
wherein the first set of values comprises a plurality of ranges,
wherein a second range of the plurality of ranges comprises first values greater than the gray value difference metric,
wherein the third range of the plurality of ranges comprises second values less than the negative version of the gray value difference metric, and
wherein the second value is a constant and the first set of values is exclusive of the second set of values;
conversion of the number of bits to a third value; and
generation of the stego-video based, at least, on calculation of a new gray value of the input pixel with which to encode the input pixel, wherein the new gray value is a function of at least one of the third value, the number of bits or the gray value difference; and
a watermark decoder configured to receive the stego-video and extract the one or more watermark bits from the stego-video.

2. The digital chip of claim 1, further comprising:
a video decoder controller configured to receive raw video data from a video decoder;
a configuration controller configured to configure the video decoder; and
a memory management unit configured to store at least one of the raw video data or the stego-video.

3. The digital chip of claim 1, further comprising:
an Ethernet controller unit configured to store at least one of the raw video data or the stego-video at, or access the at least one of the raw video data or the stego-video from, a location remote from a digital forensic chip.

4. The digital chip of claim 1, wherein the watermark encoder comprises:
a universal asynchronous receiver and transmitter configured to continually collect a sequence of the one or more watermark bits;
a bit conversion configured to convert the sequence of the one or more watermark bits from binary form into a watermark binary image; and
an encoder configured to embed the watermark binary image into the raw video data to form the stego-video.

5. The digital chip of claim 4, wherein the watermark binary image is secret data.

6. The digital chip of claim 1, wherein the digital chip is further configured to generate the stego-video or extract the one or more watermark bits from the stego-video in real-time.

7. A method, comprising:
receiving one or more watermark bits and a raw video frame; and
generating a stego-video, wherein the generating the stego-video comprises:
calculating a gray value difference of a pixel relative to a gray value of an input pixel in the raw video frame;
calculating a number of bits to be embedded in the input pixel, wherein the number of bits is calculated based on a logarithmic function of the gray value difference in response to the gray value difference being determined to be within a first range, and is calculated to be a constant value in response to the gray value difference being determined to be within a second range,
wherein the first range is exclusive of the second range,
wherein the second range is from a first gray value difference metric to a negative version of the gray value difference metric, the gray value difference metric being "1,"
wherein the first range comprises a plurality of subranges,
wherein a first subrange of the plurality of subranges comprises first values greater than the gray value difference metric;
converting the number of bits to a value; and
generating the stego-video based, at least, on calculating a new gray value of the input pixel with which to encode the input pixel;
extracting the one or more watermark bits from the stego-video; and
displaying the one or more watermark bits.

8. The method of claim 7, further comprising at least one of generating the stego-video or extracting the one or more watermark bits from the stego-video in real-time.

9. The method of claim 7, further comprising at least one of generating the stego-video or extracting the one or more watermark bits from the stego-video while operating in an online mode.

10. The method of claim 7, further comprising:
receiving raw video data; and
displaying at least one of the stego-video or the raw video data.

11. The method of claim 7, further comprising converting the one or more watermark bits from binary form into a watermark binary image, wherein the watermark binary image is secret data.

12. The method of claim 7, wherein the displaying the one or more watermark bits comprises displaying the one or more watermark bits as a picture-in-picture video.

* * * * *